United States Patent [19]

Mukawa

[11] Patent Number: 5,226,024
[45] Date of Patent: Jul. 6, 1993

[54] DISK RECORDING AND/OR REPRODUCING APPARATUS

[75] Inventor: Hiroshi Mukawa, Tokyo, Japan

[73] Assignee: Sony Corporation, Tokyo, Japan

[21] Appl. No.: 839,394

[22] Filed: Feb. 20, 1992

[30] Foreign Application Priority Data

Feb. 23, 1991 [JP] Japan .................................. 3-050617

[51] Int. Cl.⁵ ........................ G11B 11/00; G11B 5/127
[52] U.S. Cl. ........................................ 369/13; 360/114
[58] Field of Search .................. 369/13, 14, 126, 77.2, 369/75.2; 360/114, 103, 66, 59, 104, 109; 365/122

[56] References Cited

U.S. PATENT DOCUMENTS

| | | | |
|---|---|---|---|
| 4,651,242 | 3/1987 | Hirano et al. ........................ | 360/103 |
| 5,027,334 | 6/1991 | Yamanaka et al. .................... | 369/13 |
| 5,077,713 | 12/1991 | Takizawa et al. ..................... | 369/13 |
| 5,095,470 | 3/1992 | Oka et al. .............................. | 369/13 |
| 5,122,998 | 6/1992 | Mizuno et al. ......................... | 369/13 |

Primary Examiner—Robert J. Pascal
Assistant Examiner—Ali Neyzari
Attorney, Agent, or Firm—Philip M. Shaw, Jr.

[57] ABSTRACT

A disk recording and/or reproducing apparatus comprises external magnetic field generating means for applying an external magnetic field to a given area, of a rotating disk on which information signals are recorded; of a rotating disk; means for moving the external magnetic field generating means toward and away from the disk in response to commencing an operation of recording of the informational signals on the disk; and means for loading the disk on such a position where the informational signal can be recorded. The moving means moves the external magnetic field generating means toward the disk only when the loading operation of the disk by the loading means is completed. Accordingly, contact of the magnetic head with the disk while the disk is not rotated is prevented.

6 Claims, 6 Drawing Sheets

DISK RECORDING AND/OR REPRODUCING APPARATUS

BACKGROUND OF THE INVENTION

1. Field of the Invention

The present invention relates to a disk recording and/or reproducing apparatus for recording and/or reproducing informational signals on a disk such as magneto-optical disk and in particular to a disk recording and/or reproducing apparatus including a moving mechanism for moving toward and away from said disk a magnetic head for recording and/or reproducing informational signals on the disk by cooperation with an optical pickup apparatus.

2. Description of the Related Art

The magneto-optical disk having a perpendicularly magnetizable signal recording layer has been proposed as an informational signal recordable disk. In order to record the informational signals on the magneto-optical disk, an area of the signal recording layer is heated to a temperature not lower than so-called Curie temperature by an optical pickup device for converging and impinging a laser beam upon this area and simultaneously an external magnetic field is applied upon this area from an external magnetic field generator. Since the signal recording layer which has been heated to a temperature not lower than Curie temperature has little coercive force, the direction of magnetization is reversed to follow the external magnetic field. Recording of digitialized informational signals can be achieved by reversing the direction of the magnetization of the signal recording layer in such a manner in the magneto-optical disk.

The disk recording and/or reproducing apparatus which performs recording the informational signals to the magneto-optical disk comprises a disk rotating drive mechanism for holding and rotating the magneto-optical disk, the optical pickup apparatus for irradiating the signal recording layer of the magneto-optical disk with the laser beam, and the magnetic head apparatus for applying the external magnetic field to the signal recording layer.

In other words, the disk recording and/or reproducing apparatus rotates the magneto-optical disk, irradiates the signal recording layer of the disk with the optical beam by means of the optical pickup apparatus and applies the external magnetic field to the signal recording layer by means of the magnetic head apparatus so that the informational signals are recorded. The magnetic head is brought into substantial slide contact with the disk for applying the magnetic field upon the signal recording layer. The above mentioned disk recording and/or reproducing apparatus is formed in such a manner that the magnetic head apparatus contacts with the magneto-optical disk on reading of the informational signals recorded on the magneto-optical disk and on stopping of the magneto-optical disk as well as recording of the informational signals on the signal recording layer of the magneto-optical disk.

Accordingly, the durability of the magnetic head apparatus and the magneto-optical disk is diminished since wear of the magnetic head apparatus and the magneto-optical disk occurs due to slide contact therebetween even when the informational signals are not recorded. A load imposed upon the disk rotating drive mechanism is increased due to a fact that the magnetic head apparatus is normally in contact with the magneto-optical disk. Problems such as deterioration of the durability of the disk rotating drive mechanism and an increase in electric power consumption occur.

An approach can be devised that only on recording of the informational signals, the magnetic head is in contact with the magneto-optical disk by moving the magnetic head apparatus by using, for example, a plunger, etc. in response to starting operation of recording of the informational signals. However, if the disk recording and/or reproducing apparatus is formed so that the magnetic head apparatus is merely moved in response to starting operation of recording of the informational signals, the magnetic head apparatus and the magneto-optical disk may be damaged due to collision of the magnetic head apparatus on the magneto-optical disk on this moving operation.

OBJECTS AND SUMMARY OF THE INVENTION

It is therefore an object of the present invention to provide a disk recording and/or reproducing apparatus in which the problems of the prior art apparatus are overcome, the slide contact between a magnetic disk apparatus and a head is minimum, the durability of the magnetic head, enhancement in the magnetic head apparatus, the disk and a disk rotating drive apparatus and reduction in power consumption can be achieved and impact on contact of the magnetic head apparatus with the disk can be relaxed.

The disk recording and/or reproducing apparatus of the present invention, comprises: external magnetic field generating means for applying an external magnetic field to a given area, of a rotating disk on which information signals are recorded, means for moving said external magnetic field generating means toward and away from said disk in association with the commencing of recording of the informational signals on said disk; and means for loading said disk on such a position where the informational signals can be recorded. The moving means moves said external magnetic field generating means toward said disk only when loading operation of said disk by said loading means is completed.

The other objects and advantages of the present invention will become more apparent by reading the description of the embodiment with reference to the drawings.

DETAILED DESCRIPTION OF THE PREFERRED EMBODIMENTS

A preferred embodiment of the present invention will now be described with reference to drawings.

Figure 6:
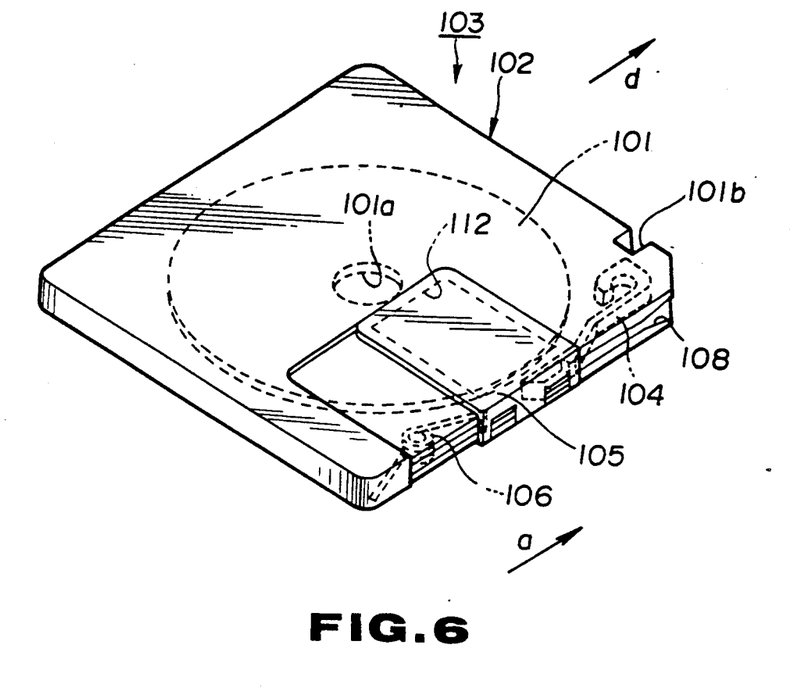
FIG. 6 is a perspective view showing a disk cartridge used for the disk recording and/or reproducing apparatus.
Figure 7:
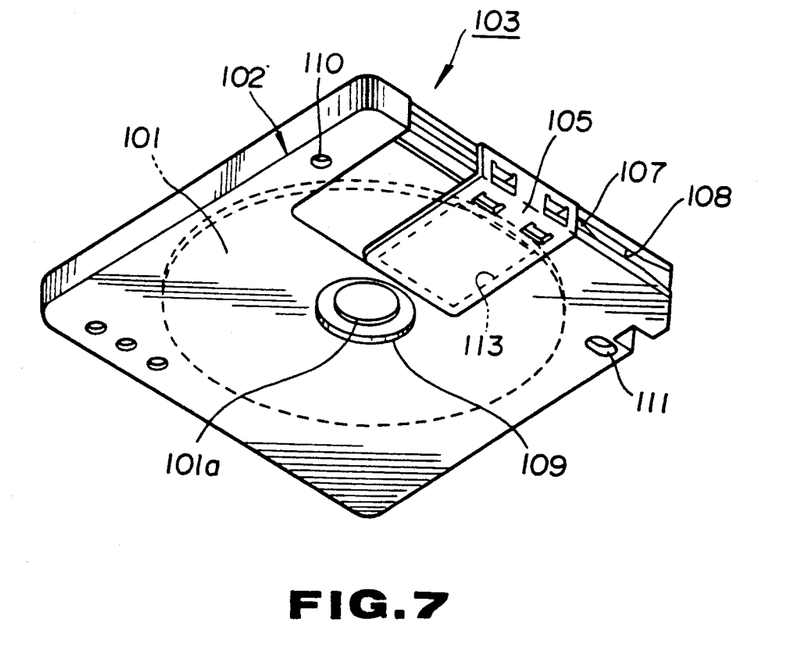
FIG. 7 is a perspective view showing the lower side of the disk cartridge.

In this embodiment, a disk cartridge 103 housing a magneto-optical disk 101 is mounted on a cartridge main body 102 which is shown in FIGS. 6 and 7 and a disk recording and/or reproducing apparatus of the present invention is adapted to record and/or reproducing informational signals to and/or from the magneto-optical disk 101.

The disk cartridge 103 comprises the cartridge main body 102 which houses therein the magneto-optical disk 101 which is formed so that informational signals can be recorded thereon and/or read therefrom.

The magneto-optical disk 101 comprises a disk substrate which is formed of a synthetic resin material such as polycarbonate having a light transmission properties and a signal recording layer coated on one main side of the disk substrate, which can be perpendicularly magnetized. Recording of informational signals on the magneto-optical disk 101 can be achieved by impinging a converged laser beam upon the signal recording layer to heat the layer while applying an external magnetic field thereon from a magnetic head which is external magnetic field generating means so that the direction of magnetization in small domains of the signal recording layer is reversed. The informational signals which have been recorded on the signal recording layer can be read therefrom by impinging a converged laser beam on the signal recording layer for detecting a change in the polarization direction of the reflected light.

The magneto-optical disk 101 is rotatably housed in the cartridge main body 102 which is formed into a thin box having a substantially rectangular main side. The cartridge main body 102 has a recording and/or reproducing openings 112 and 113 through which at least a part of each of both sides of the magneto-optical disk 101 is externally exposed in a radial direction of the disk 101. The recording and/or reproducing openings 112 and 113 can be opened or closed by shutter member 105. The shutter member 105 is mounted on the outer side of the cartridge main body 102 and is slidable from a position where the recording and/or closing openings are closed to a position where they are closed in an insertion direction of the disk cartridge 103 as represented by an arrow d in FIG. 6.

The shutter member 105 is normally biased by a biasing spring 106 in a direction as represented by an arrow a in FIG. 6 toward a position where the recording and/or reproducing openings 112 and 113 are closed. A locking member 104 for locking in the shutter member 105 when the shutter member 105 is in a position where the recording and/or reproducing openings 112 and 113 are closed is provided in the cartridge main body 102. A part of the locking member 104 is externally exposed through a locking releasing slit 108 provided on the side of the cartridge main body 102.

The cartridge main body also has a chucking opening 109 through which the inner peripheral portion of the magneto-optical disk 101 including a center hole 101a provided in the center of the disk 101 is externally exposed. The cartridge main body 102 is provided with a pair of positioning holes 110 and 111 at the corners of the lower main side of the cartridge 102. A magnetic piece which will be attracted to a magnet of a disk table 5 which will be described hereafter is provided on the other main side of the magneto-optical disk 101 so that the magnetic piece closes the center hole 101a.

The magneto-optical disk 101 used for the disk recording and/or reproducing apparatus is about 64 mm in diameter and about 1.2 mm thickness. The external dimensions of the cartridge main body 102 are such that one side is about 68 mm to 72 mm in length and the thickness is about 5 mm.

Figure 1:
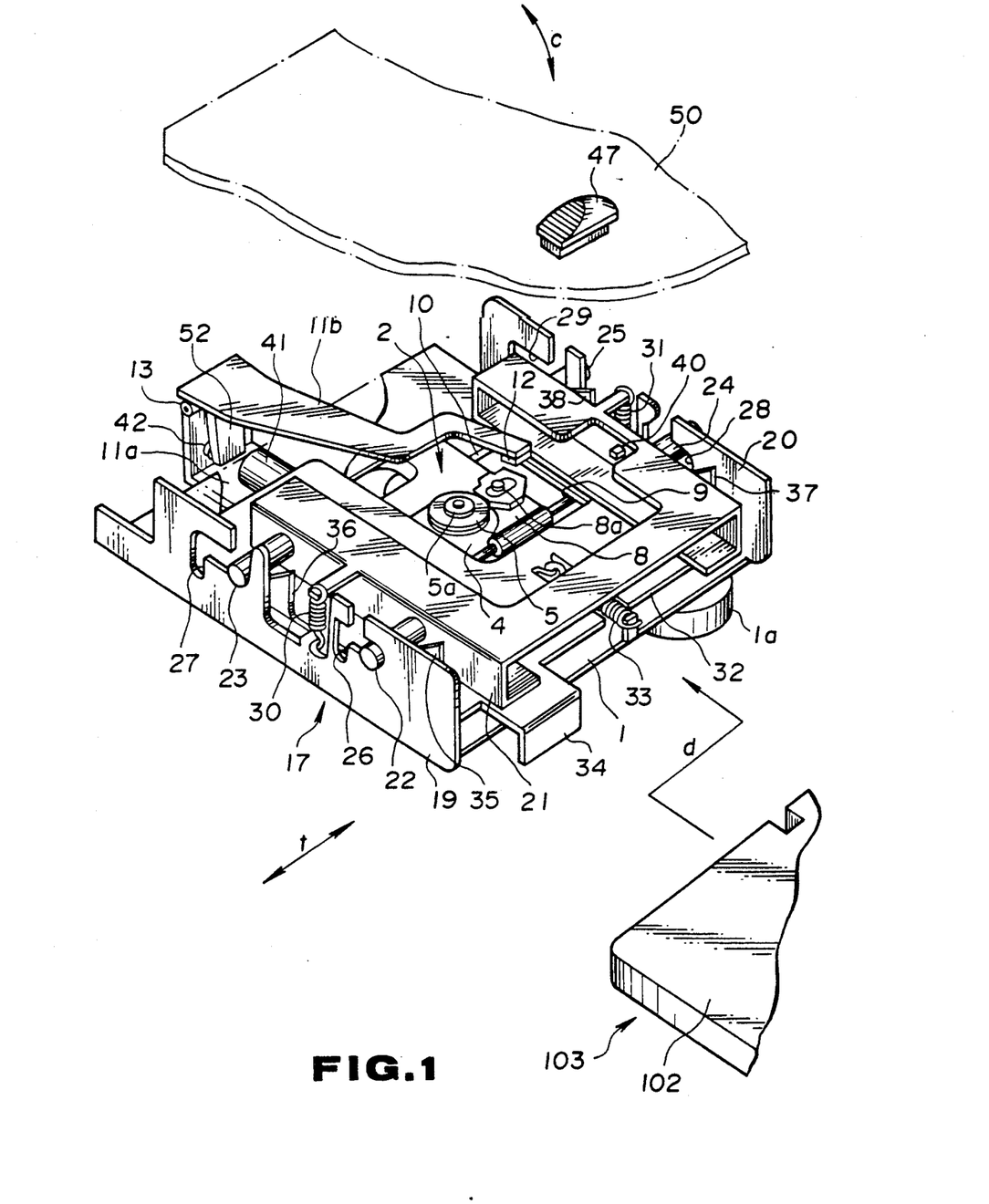
FIG. 1 is a partly exploded and perspective view showing main components of a disk recording and/or reproducing apparatus in accordance with the present invention.
Figure 2:
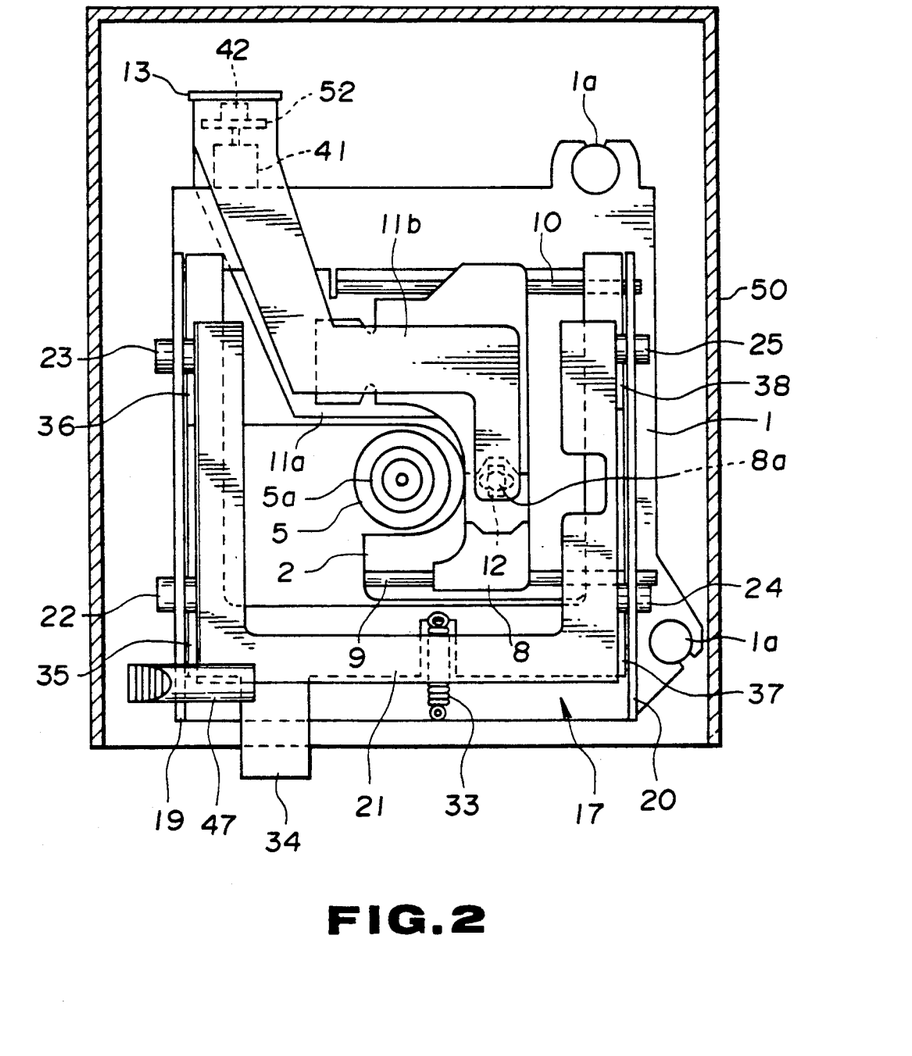
FIG. 2 is a plane view, partly in section, showing main components of the disk recording and/or reproducing apparatus.

The disk recording and/or reproducing apparatus includes a chassis 1 as shown in FIG. 1. The chassis 1 is supported on dampers 1a to that it is disposed in an external housing 50.

The dampers 1a are formed of a material such as rubber having an elasticity into a hollow and substantially cylindrical shape.

A fluidic material having an appropriate viscosity is charged in the dampers 1a. The dampers 1a are provided in a plurality of positions in consideration of balance of weight of the chassis 1 and the components for absorbing the vibrations and shocks propagating from an external position via the external housing 50 for protecting the components forming the disk recording and/or reproducing apparatus disposed on the chassis 1.

A disk rotating drive mechanism 2 on which the magneto-optical disk 101 of the disk cartridge 103 is loaded is provided on the chassis 1. The disk rotating drive mechanism 2 comprises a spindle motor 4 and a disk table 5 which is mounted a drive shaft of the spindle motor 4. The drive shaft of the spindle motor 4 is substantially perpendicular to the chassis 1. The disk table 5 has a tapered projection 5a provided in the center thereof which will be adapted into and engaged with the center hole 101a when the magneto-optical disk 101 is placed thereon. The disk table 5 has the magnet for attracting the magnetic piece which is mounted for closing the center hole 101a.

An optical pickup apparatus 8 is provided on the chassis 1. The optical pickup apparatus 8 comprises an optical system block which is formed by, for example, aluminum die casting or of a synthetic resin and a light source such as semiconductor laser, a photodetector such as photodiode and a plurality of optical components which are disposed in the optical system block. The optical pickup apparatus 8 is arranged to converge an optical beam emitted from the light source by an objective lens 8a and to direct the converged beam toward the magneto-optical disk 101 on the disk table 5. The optical pickup apparatus 8 is also arranged to detect the reflected (returning) light transmitted through the objective lens 8a from the magneto-optical disk 101 by the optical detector.

The optical pickup apparatus 8 can be operated so that it is movable between a position in the vicinity of the spindle motor 4, i.e., a position where the apparatus faces to the inner periphery of the magneto-optical disk 101 placed on the disk table 5 and a position where the apparatus faces to the outer periphery of the magneto-optical disk 101. The optical pick-up apparatus 8 has the optical system block which is supported by a guide shaft 9 provided on the chassis 1 and a support shaft 10 which is disposed in parallel with the guide shaft 9 so that the apparatus is guided by the shafts 9 and 10 and is movable in a radial direction of the magneto-optical disk 101 placed on the disk table 5 as shown by an arrow t in FIG. 1. The optical pickup apparatus is supported in such a manner that the objective lens 8a faces to the side of the magneto-optical disk 101 placed on the disk table 5 facing to the chassis 1. In other words, the optical pickup apparatus 8 enables the objective lens to face to the magneto-optical disk placed on the disk table 5 in a radial direction thereof.

A magnetic head apparatus 12 comprising an external magnetic field generating coil is mounted on the optical pickup apparatus 8 through first and second magnetic head supporting arms 11a and 11b. The first magnetic head supporting arm 11a is secured to the optical pickup apparatus 8 at the base end thereof and is bent toward the disk table 5 into an L-shape at the tip end thereof. The second magnetic head supporting arm 11b which is formed in substantially flat shape is secured to the tip end of the first magnetic head supporting arm 11a at the base end thereof so that it is rotatable around a rotary shaft 13. The magnetic head apparatus 12 is secured to the tip end of the second magnetic head supporting arm 11b, which faces tot he chassis 1.

The magnetic head apparatus 12 is moved together with the magnetic head supporting arms 11a and 11b and normally faces to the objective lens 8a even when the optical pickup apparatus 8 is guided to move by the guide shaft 9. The second magnetic head supporting arm 11b is rotated around the rotary shaft 13 relative to the first magnetic head supporting arm 11a for moving the magnetic head apparatus 12 to and from the objective lens 8a.

The first magnetic head supporting arm 11a is provided with a magnetic head lifting motor 41 for rotating the second magnetic head supporting arm 11b relative to the first magnetic head supporting arm 11a. When the disk recording and/or reproducing apparatus is brought into a recording mode, the magnetic head lifting motor 41 is rotated in a normal direction for moving the magnetic head 12 toward the objective lens 8a. When the recording mode is released, the motor is rotated in an opposite direction for moving the magnetic head 12 from the objective lens 8a.

A substantially cylindrical rotary cam 42 is secured to a drive shaft 41a of the magnetic head lifting motor 41. The rotary cam 42 is formed into a substantial worm gear having a spiral projection 42a forming a cam on the outer periphery thereof. The rotary cam 42 is rotated in a normal and reversal direction depending upon the rotation of the magnetic head lifting motor in a normal or reverse direction. A follower pawl 52 is formed in the base end side of the second magnetic head supporting arm 11b integrally therewith. The follower pawl 52 faces to the base end side of the drive shaft 41a of the rotary cam 42 in an initial state is brought into engagement with the projection 42a when the magneto-optical disk 101 is placed on the disk table 5. When the rotary cam 42 is rotated in a normal direction while the follower pawl 52 is engaged with the projection 42a, the follower pawl 52 is pivoted to move the magnetic head apparatus 12 together with the second magnetic head support arm 11b until the magnetic head apparatus 12 is brought into contact with the magneto-optical disk on the disk table 5. When the rotary cam 42 is rotated in a reverse direction, the follower pawl 52 is pivoted to move the magnetic head apparatus 12 together with the second magnetic head support arm 11b apart from the magneto-optical disk 101 to the initial position.

The disk recording and/or reproducing apparatus is arranged so that the optical pickup apparatus 8 and the magnetic head apparatus 12 are controlled under control of a control (not shown) by the manipulation of a recording operation button 47. Since the magnetic head lifting motor 41 is mounted on the first magnetic head supporting arm 11a, the magnetic head lifting motor 41 is movable toward or apart from the magneto-optical disk 101 on the disk table 5 independently of the position of the optical pickup apparatus.

A disk cartridge loading mechanism 17 for loading the disk cartridge 103 on the disk rotating drive mechanism is formed on the chassis 1.

The disk cartridge loading mechanism 17 has a pair of side plates 19 and 20 projected on the chassis 1 so that they sandwich the disk table 5 therebetween as shown in FIGS. 1 to 5. The side plates 19 and 20 are provided so that they are normal to the guide shaft 9.

A cartridge holder 21 into which the disk cartridge 103 is inserted is disposed so that the holder is located on the upper side of the disk table 5. The cartridge holder 21 is formed into a box member having an open side into which the disk cartridge 102 is insertable. A part of the lower side of the holder 21 facing to the chassis 1 and a part of the upper side of the holder 21 opposite to the lower side of the holder 21 are opened. A pair of supporting shafts 22 and 23 or 24 and 25 is projectingly provided on each of the opposite sides of the holder 21 facing to the respective side plates 19 and 20. The pair of the shafts 22 and 23 provided on one side of the chassis facing to one 19 of the side plates of the cartridge are adapted into and engaged with corresponding guide slits 26 and 27 formed the side plate 19, respectively. The other pair of the shafts 24 and 25 provided on the other side of the chassis facing to the other side plate 20 of the cartridge holder 21 are engaged into and engaged with corresponding guide slits 28 and 29 formed on the other side plate 20 of the holder 21.

In such a manner, the cartridge holder 21 is supported on the pair of the side plates 19 and 20 by the engagement of the support shaft 22, 23, and 24 and 25 with 26, 27 and 28, 29, respectively. Each of the guide slits 26, 27 and 28, 29 is in the L-shaped including a slit which is parallel with the chassis 1 and a slit which extends toward the chassis 1 from the rear side of the parallel slit. In other wards, the cartridge holder 21 is supported in such a manner that it is moved rearward along the chassis 1 as represented by an arrow f in FIG. 3 and is moved toward the chassis 1 as represented by an arrow g in FIG. 3.

Figure 3:
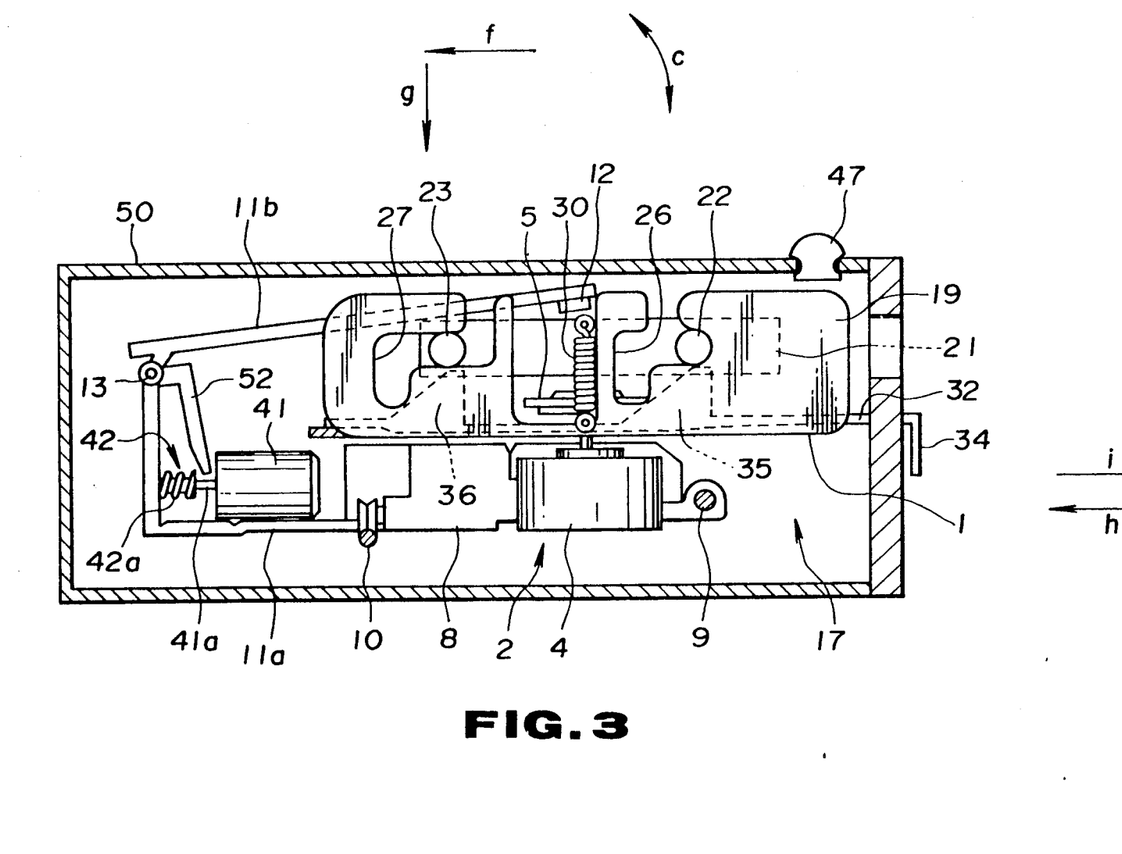
FIG. 3 is an elevational new, partly in section, showing the disk recording and/or reproducing apparatus prior to loading.
Figure 4:
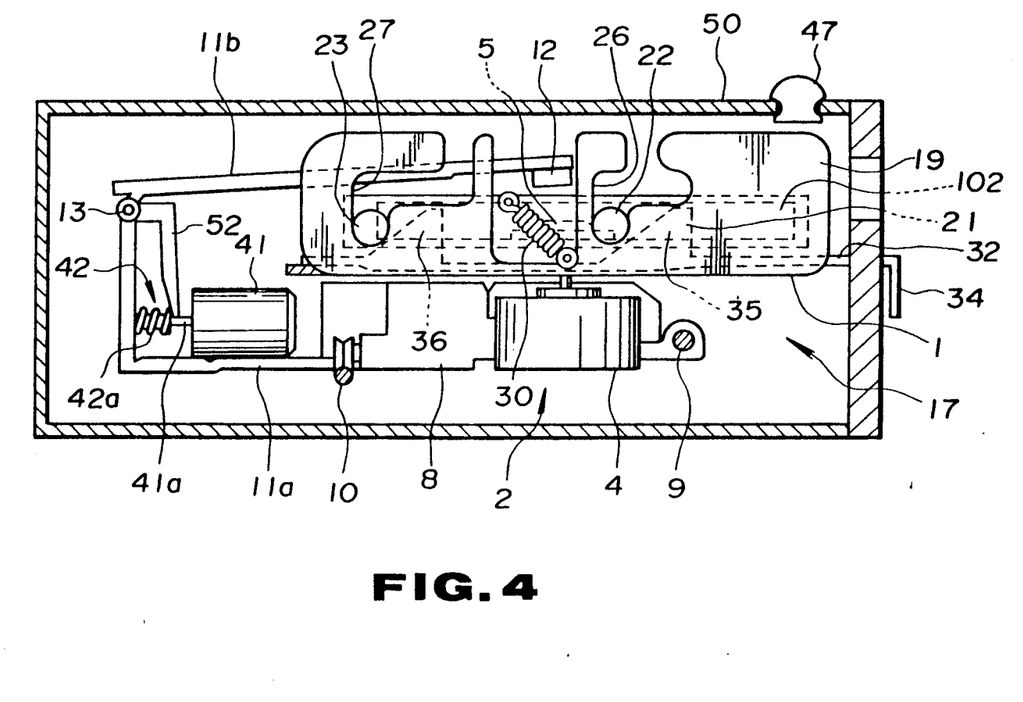
FIG. 4 is an elevational new, partly in section, showing the disk recording and/or reproducing apparatus after loading.
Figure 5:
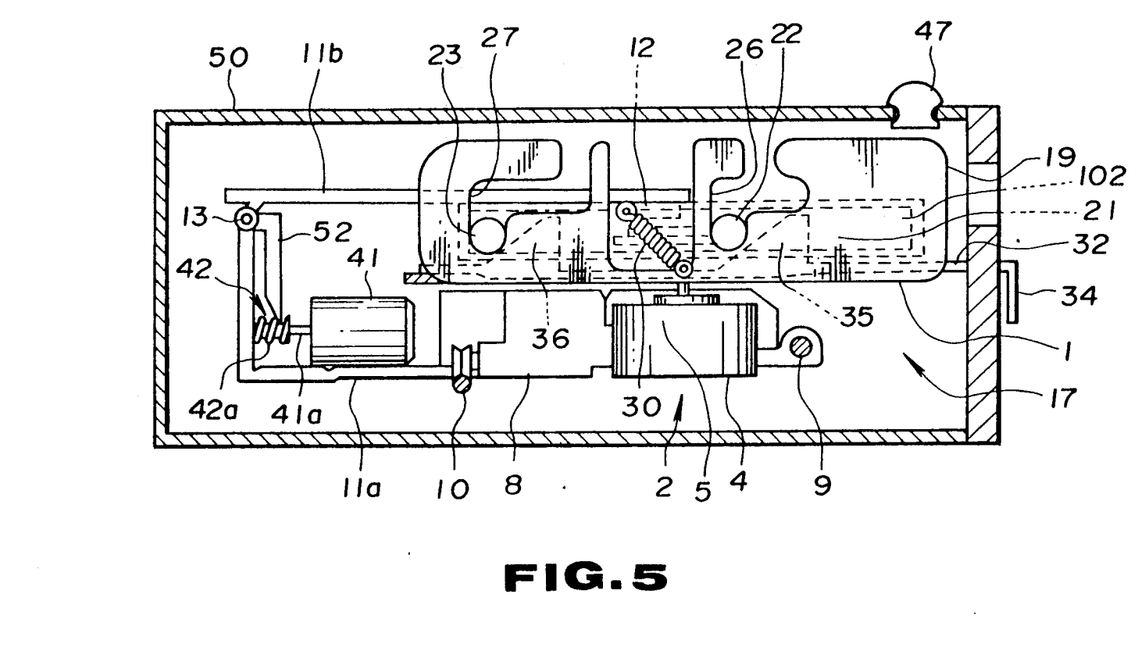
FIG. 5 is an elevational new, partly in section, showing the disk recording and/or reproducing apparatus when recording operation is performed.

A pair of tension coil springs 30 and 31 is tensioned between the cartridge holder 21 and each of the side plates 19 and 20, respectively. The tension springs 30 and 31 are provided in the substantially central position between both sides of the cartridge holder so that it is substantially perpendicular to the chassis 1 when the cartridge holder 21 is positioned in the front side as shown in FIG. 3. Accordingly, when the cartridge holder 21 is moved rearward, the holder 21 is biased in a forward, downward and inclined direction by the tension spring and is moved toward the chassis 1 as shown in FIG. 4 when the support shaft 22, 23, 24 and 25 reach the rear ends of the guide slits 26, 27, 28 and 29, respectively.

When the cartridge holder 21 is positioned in the front side, the cartridge holder 21 contacts with the second magnetic head support arm 11b. The support arm 11b is held in a position for moving the magnetic head apparatus 12 away from the magneto-optical disk 101 on the disk table 5. When the cartridge holder 21 is moved toward the chassis 1, the cartridge holder 21 is separated from the second magnetic head support arm 11b to enable the second magnetic head support arm 11b to pivot to a position where the magnetic head apparatus 12 contacts with the magneto-optical disk 101 on the disk table 5. At this time, the follower pawl 52 is brought into engagement with the projection 42a as shown in FIG. 4.

A shutter member opening pin 40 projects in a position located in inner side of the cartridge holder 21 and corresponding to the side where the shutter member 105 of the disk cartridge 103 which is inserted into the cartridge holder 21. When the disk cartridge 103 is inserted into the cartridge holder 21, the shutter member opening pin 40 is moved into the shutter opening slit 108 and is brought into contact with the lock member 107 to elastically displace the lock member for releasing the engagement of the lock member 107 with the shutter member 105.

An eject plate 32 is disposed between the chassis 1 and the cartridge holder 21 so that it is slidable in forward or rearward direction. The eject plate 32 is biased forward by a tension coil spring 33 tensioned between the front end of the eject plate 32 and the chassis 1 as represented by an arrow i in FIG. 3. The eject plate 32 is provided with a depress manipulation portion 34 at the front end thereof. When the depression manipulation portion 34 is depressed with a finger, the eject plate 32 is moved rearward as represented by an arrow h in FIG. 3 against the biasing force of the tension coil spring 33.

A pair of eject cams 35 and 36 or 37 and 38 is provided in each side of the eject plate 32 so that it extends along the side plate 19 or 20. Each of the eject cams 35, 36, 37 and 38 has an inclined cam portion which is inclined toward the chassis 1 from the front side to the rear side thereof. When the eject plate 32 is moved rearward, the cam portion is brought into contact with each of the support shafts 22, 23, 24 and 25 which are positioned at the rear ends of the guide slits 26, 28 and 29, respectively.

In the thus formed disk cartridge loading mechanism 17, when the disk cartridge 103 is inserted into the cartridge holder 21, the shutter member 105 is moved relative tot he cartridge main body 102 by the shutter member opening pin 40 for opening the recording and/or reproducing opening. When the cartridge main body 102 is further inserted into the cartridge holder 21, the cartridge holder 21 is forced by the cartridge main body 102 to move rearward as represented by an arrow f in FIG. 3. Then, the cartridge holder 21 is moved toward the chassis 1 as represented by an arrow g in FIG. 3 by the biasing force of the pair of the tension coil springs 30 and 31. At this time, the disk table 5 is moved into the cartridge main body 102 through the central hole 109 for holding the magneto-optical disk 101 by adapting a tapered projection 5a to the center hole 101.

The cartridge main body 102 is positioned and held by the engagement of positioning pins (now shown) projecting on the chassis 1 with the positioning holes 110 and 111. Under this condition, the magneto-optical disk 101 can be driven to rotate together with the disk table 5 by the spindle motor 4. The objective lens 8a of the optical pickup apparatus 8 faces to the magneto-optical disk 101.

In order to bring the disk recording and/or reproducing apparatus into recording mode, the magneto-optical disk 101 is placed upon the disk table 5 by inserting the disk cartridge 103 into the disk holder 21 as described above. Then, the recording mode is preset by depressing the recording button 47. This causes the magnetic head lifting motor 41 to be rotated in a normal direction so that the magnetic head apparatus 12 is moved toward the magneto-optical disk 101 and the disk rotating drive mechanism 2 rotates the magneto-optical disk 101. The optical pickup apparatus 8 converges an optical beam and impinges it upon the magneto-optical disk 101 for achieving recording of informational signals on the magneto-optical disk 101.

In other words, the magnetic head apparatus 12 is in slide contact with the magneto-optical pickup apparatus 8 converges the optical beam and impinges it upon a signal recording portion of the magneto-optical disk for heating it. This achieves recording of the informational signals on the magneto-optical disk 101.

In the recording and/or reproducing apparatus, the moving speed of the magnetic head apparatus 12 when the magnetic head assembly 12 is brought into contact with the magneto-optical disk 101 is reduced to such a low speed that the magnetic head apparatus 12 and the magneto-optical disk 101 are not damaged by properly designing the shape of the projection 42a of the rotary cam 42 and by presetting the rotational drive speed of the head lifting motor 41.

In order to reset the recording mode, a stop button (not shown) is depressed. This causes the magnetic head lifting motor 41 to be rotated in a reverse direction so that the magnetic head apparatus 12 is separated from the magneto-optical disk 101 is stopped and the optical pickup apparatus 8 is brought into inactive state.

When reproducing or playback mode is selected in the recording and/or reproducing apparatus, rotation of the magneto-optical disk 101 and converging of the optical beam and impingement of the beam on the magneto-optical disk 101 are carried out by the rotation drive apparatus 2 and the optical pickup apparatus 8, respectively and the magnetic head lifting motor 41 is not rotated. In other words, in the reproducing mode of the disk recording and/or reproducing apparatus, the magnetic head apparatus 12 is not in slide contact with the magneto-optical disk 101.

In order to eject the disk cartridge located in the disk cartridge loading mechanism 17, the eject plate 32 is moved rearward against the biasing force of the tension coil spring 33 by depressing the depression manipulation portion 34 with a finger. The eject operation is thus performed. Such an eject operation causes the eject plate 32 to be moved rearward against the tension col spring 33. Then, the eject cams 35, 36, 37 and 38 are brought into contact with the support shafts 22, 23, 24 and 25, respectively from the chassis 1 for moving the cartridge holder 21 away from the chassis 1 by the support shafts 22, 23, 24 and 25. When the cartridge holder 21 is moved away from the chassis 1, the cartridge holder 21 is moved forward in a direction opposite to that of an arrow f in FIG. 3 along the chassis 1 by the biasing force of the pair of tension coil springs 30 and 31 by ejecting the disk cartridge 103 to outside of the external housing 50.

As mentioned above, in the disk recording and/or reproducing apparatus of the present invention, the magnetic head support arm having one end on which the magnetic head apparatus for applying a magnetic field on the disk is mounted and the other end facing to the rotary cam is engaged with the cam portion of the rotary cam at the other end only when loading of the disk is completed and is moved for moving the magnetic head apparatus toward the disk by the rotating drive means for rotating the rotary cam only when commencing of recording of informational signals on the disk is instructed.

Accordingly, in the disk recording and/or reproducing apparatus, the magnetic head apparatus is separated from the disk on reading of the informational signals from the disk or stopping of the disk. In other words, in the disk recording and/or reproducing apparatus, contact or approach between the magnetic head apparatus and the disk is suppressed to the necessary minimum so that the wear of the magnetic head apparatus and the disk is minimized. In the disk recording and/or reproducing apparatus, a load imposed upon the disk rotating drive mechanism for rotating the disk is reduced. Accordingly, enhancement in durability of the disk rotating drive mechanism and reduction in consumed power can be achieved.

In the disk recording and/or reproducing apparatus, the moving speed of the magnetic head apparatus when approaching to the disk is controlled depending upon the shape of the cam portion of the rotary cam and the rotational drive speed of the rotating drive means. In other words, in the disk recording and/or reproducing apparatus, the moving speed of the magnetic head apparatus when it is brought into contact with the disk of the magnetic head apparatus is made sufficiently low by appropriately designing the shape of the cam portion and presetting the rotational drive speed of the rotating drive means so that shock occurred when the magnetic head apparatus is brought into contact with the disk can be mitigated.

What is claimed is:

1. A disk recording apparatus, comprising:
    external magnetic field generating means for applying an external magnetic field to a given area of a rotating disk on which information signals are recorded;
    means for moving the external magnetic field generating means toward the disk in association with the commencement of recording of the informational signals on the disk, the moving means including rotating drive means which is operated in response to commencement of recording of the informational signals on the disk and a rotary cam which is rotated by the rotating drive means, the external magnetic field generating means being moved toward the disk by rotating the rotary cam by means of the rotating drive means;
    means for loading the disk at a position where the informational signals can be recorded, the moving means moving the external magnetic field generating means toward the disk only when a loading operation of the disk by the loading means is completed; and
    wherein the external magnetic field generating means includes a magnetic head, and a head support arm having one end to which the magnetic head is mounted and the other end facing the rotary cam;
    the head support arm being engaged with the cam portion of the rotary cam at the other end thereof only when the loading operation of the disk is completed and the magnetic head being moved toward the disk only when recording of the informational signals on the disk is started.

2. A disk recording apparatus, comprising:
    external magnetic field generating means for applying an external magnetic field to a given area of a rotating disk on which information signals are recorded;
    means for moving the external magnetic field generating means toward the disk in association with the commencement of recording of the informational signals on the disk, the moving means including rotating drive means which is operated in response to commencement of recording of the informational signals on the disk and a rotary cam which is rotated by the rotating drive means, the external magnetic field generating means being moved toward the disk by rotating the rotary cam by means of the rotating drive means;
    means for loading the disk at a position where the informational signals can be recorded, the moving means moving the external magnetic field generating means toward the disk only when a loading operation of the disk by the loading means is completed; and
    wherein the external magnetic field generating means includes a magnetic head and first and second head support arms,
        the first head support arm having one end on which an optical pickup apparatus is mounted and another end on which the magnetic head is mounted so that it faces the optical pickup apparatus, the first head support arm being rotatably mounted and movable in a radial direction of the disk together with the optical pickup apparatus.

3. A disk recording apparatus as defined in claim 2 in which the second head support arm is rotatably supported and mounted on the first head support arm at a base end thereof and the magnetic head is mounted on a tip end of the second head support arm and moved toward or away from the disk by pivoting the second head support arm.

4. A disk recording apparatus as defined in claim 2 in which the rotating drive means is mounted on the first head support arm so that it is movable together with the optical pickup apparatus in a radial direction of the disk.

5. A disk recording apparatus, comprising:
    external magnetic field generating means for applying an external magnetic field upon a disk rotatably housed in a disk cartridge through an opening in the disk cartridge
    rotating means on which the disk is held for rotating the held disk;
    a cartridge holder into which the disk cartridge is inserted and which is movable between a position in which the disk cartridge is insertable into the cartridge holder and a position in which the disk is driven to rotate by the rotating means; and
    means for moving the external magnetic field generating means toward the disk in response to commencement of recording of informational signals upon the disk, the moving means moving the external magnetic field generating means toward the disk only when the operation of moving of the cartridge holder to the drive position is completed, wherein
        the moving means includes rotating drive means which is operated in response to the commencement of recording of the informational signals on the disk and a rotary cam which is rotated by the rotating drive means;
        the external magnetic field generating means is moved toward the disk by rotating the rotary cam by the rotating drive means;
        the external magnetic field generating means includes a magnetic head and a head support arm which is provided with the magnetic head at one end thereof and is movable for moving the magnetic head toward and away from the disk;

the cartridge holder being brought into contact with the head support arm while the cartridge holder is in the insertion position so that the head support arm is held in a position remote from the disk held by the rotating means and the cartridge holder being moved away from the head support arm when the cartridge holder is moved to the drive position to enable the magnetic disk to move to contact with the disk.

6. A disk recording apparatus as defined in claim 5 and further including conveying means for conveying the disk cartridge inserted and held in the cartridge holder between an insertion position in which the disk cartridge is insertable into the cartridge holder and a drive position in which the disk in the disk cartridge is driven to rotate by the rotating means and in which the magnetic head is enabled to move to contact with the disk only when conveying of the disk cartridge to the drive position is completed and the magnetic head is moved toward the disk only when recording of the informational signals on the disk is started.

* * * * *